US011218837B2

United States Patent
Kim et al.

(10) Patent No.: US 11,218,837 B2
(45) Date of Patent: Jan. 4, 2022

(54) METHOD FOR DETERMINING POSITION IN VEHICLE USING VEHICLE MOVEMENT AND APPARATUS THEREFOR

(71) Applicant: Samsung Electronics Co., Ltd., Suwon-si (KR)

(72) Inventors: Jinik Kim, Suwon-si (KR); Namjoon Park, Suwon-si (KR); Seongmin Je, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/947,538

(22) Filed: Aug. 5, 2020

(65) Prior Publication Data

US 2021/0044923 A1 Feb. 11, 2021

(30) Foreign Application Priority Data

Aug. 5, 2019 (KR) .................. 10-2019-0095041

(51) Int. Cl.
*H04W 24/00* (2009.01)
*H04W 4/02* (2018.01)
*H04W 4/48* (2018.01)

(52) U.S. Cl.
CPC ........... *H04W 4/023* (2013.01); *H04W 4/027* (2013.01); *H04W 4/48* (2018.02)

(58) Field of Classification Search
CPC ........... H04Q 4/023; H04Q 4/027; H04Q 4/48
See application file for complete search history.

(56) References Cited

U.S. PATENT DOCUMENTS

| 9,358,940 | B2 | 6/2016 | Cooper et al. |
| 9,428,127 | B2 | 8/2016 | Cooper et al. |
| 9,467,817 | B1 | 10/2016 | Van Wiemeersch |
| 9,505,365 | B1 | 11/2016 | Van Wiemeersch |
| 9,510,159 | B1 | 11/2016 | Cuddihy et al. |

(Continued)

FOREIGN PATENT DOCUMENTS

| JP | 2017-505253 A | 2/2017 |
| KR | 10-2015-0103064 A | 9/2015 |

(Continued)

OTHER PUBLICATIONS

International Search Report the International Searching Authority in connection with International Application No. PCT/KR2020/010247 dated Nov. 25, 2020, 4 pages.

*Primary Examiner* — Erika A Washington

(57) ABSTRACT

Disclosed is an electronic device including a motion sensor, a communication circuit, a processor, and a memory. The processor may monitor movement of the electronic device using the motion sensor when being connected to an in-vehicle electronic device of the vehicle, and may obtain first movement information of a first external electronic device from the first external electronic device within the vehicle using the communication circuit. The processor may estimate a first movement parameter of the first external electronic device generated by the specified rotation, from the first movement information when a specified rotation of the electronic device is detected using the motion sensor, and may compare the first movement parameter with a reference value to estimate a position of the first external electronic device within the vehicle.

17 Claims, 9 Drawing Sheets

(56) References Cited

U.S. PATENT DOCUMENTS

| | | | |
|---|---|---|---|
| 9,544,742 | B2 | 1/2017 | Van Wiemeersch |
| 9,630,628 | B2 | 4/2017 | Holub |
| 9,867,035 | B2 | 1/2018 | Simon et al. |
| 9,936,358 | B2 | 4/2018 | Gruteser et al. |
| 9,980,090 | B2 | 5/2018 | Gujral et al. |
| 10,062,285 | B2 | 8/2018 | Simon |
| 10,328,898 | B2 | 6/2019 | Golsch et al. |
| 10,328,899 | B2 | 6/2019 | Golsch |
| 10,812,952 | B2 | 10/2020 | Gruteser et al. |
| 2011/0117903 | A1* | 5/2011 | Bradley ............... H04W 4/02 455/418 |
| 2014/0179348 | A1 | 6/2014 | Simon |
| 2014/0179353 | A1 | 6/2014 | Simon |
| 2014/0195125 | A1* | 7/2014 | Siegel ............... B60H 1/00742 701/49 |
| 2015/0019266 | A1* | 1/2015 | Stempora ............... G06Q 40/08 705/4 |
| 2016/0142877 | A1 | 5/2016 | Gujral et al. |
| 2017/0366945 | A1* | 12/2017 | Uliyar ............... G01S 19/51 |
| 2018/0099643 | A1 | 4/2018 | Golsch et al. |
| 2018/0295482 | A1 | 10/2018 | Gruteser et al. |
| 2019/0263356 | A1 | 8/2019 | Golsch et al. |
| 2020/0247363 | A1 | 8/2020 | Golsch et al. |
| 2020/0252749 | A1 | 8/2020 | Shin et al. |

FOREIGN PATENT DOCUMENTS

| | | |
|---|---|---|
| KR | 10-2019-0023555 A | 3/2019 |
| WO | 2019040872 A1 | 2/2019 |

* cited by examiner

METHOD FOR DETERMINING POSITION IN VEHICLE USING VEHICLE MOVEMENT AND APPARATUS THEREFOR

CROSS-REFERENCE TO RELATED APPLICATION

This application is based on and claims priority under 35 U.S.C. § 119 to Korean Patent Application No. 10-2019-0095041, filed on Aug. 5, 2019, in the Korean Intellectual Property Office, the disclosure of which is incorporated by reference herein its entirety.

BACKGROUND

1. Field

The disclosure relates to a method for determining a position in a vehicle and an apparatus therefor.

2. Description of Related Art

Nowadays, various functions for improving the convenience of a driver are mounted in a vehicle. For example, the vehicle may include a cluster (e.g., an instrument panel) capable of displaying information associated with driving information. Furthermore, the vehicle may include an in-vehicle infotainment (IVI) system for playing various pieces of information and multimedia. To provide such the infotainment system, a center information display (CID) is widely used in addition to a cluster.

The vehicle may provide a passenger with various services, using an external electronic device as well as an in-vehicle system. For example, the vehicle may communicate with another electronic device (e.g., a mobile phone positioned in the vehicle) based on vehicle-to-device (V2D) communication. The vehicle may determine whether a user of the other electronic device boards the vehicle, based on communication with the other electronic device.

The above information is presented as background information only to assist with an understanding of the disclosure. No determination has been made, and no assertion is made, as to whether any of the above might be applicable as prior art with regard to the disclosure.

For example, to provide a service suitable for a user's context, a vehicle may need to identify a driver or fellow passenger among a plurality of users in the vehicle. However, when a plurality of electronic devices is connected to the vehicle, it is difficult for the vehicle to know which electronic device among the plurality of electronic devices is associated with any user. For example, it is difficult to know which device of the plurality of electronic devices is associated with a driver.

To identify an electronic device associated with a driver or fellow passenger among a plurality of electronic devices, the position of the electronic device in the vehicle may be first identified. For example, the user may specify the position of each passenger. In this case, it is difficult for the driver to operate the vehicle due to driving. Besides, a user experience may be degraded because the user needs to specify positions of all passengers. For another example, to distinguish from the driver, the user's position in the vehicle may be determined based on indoor positioning. In the case of the indoor positioning based on signal transmission/reception in the vehicle, it is difficult to use the indoor positioning as a practical solution because the accuracy of the indoor positioning is low.

Aspects of the disclosure are to address at least the above-mentioned problems and/or disadvantages and to provide at least the advantages described below. Accordingly, an aspect of the disclosure is to provide an apparatus and a method for solving the above-described problems.

SUMMARY

In accordance with an aspect of the disclosure, an electronic device positioned inside a vehicle may include a motion sensor, a communication circuit, a processor operatively connected to the motion sensor and the communication circuit, and a memory operatively connected to the processor. The memory may store one or more instructions that, when executed, cause the processor, to monitor movement of the electronic device, using the motion sensor when being connected to an in-vehicle electronic device of the vehicle, to obtain first movement information of a first external electronic device from the first external electronic device within the vehicle, using the communication circuit, to estimate a first movement parameter of the first external electronic device generated by the specified rotation, from the first movement information when a specified rotation of the electronic device is detected using the motion sensor, and to compare the first movement parameter with a reference value to estimate a position of the first external electronic device within the vehicle.

In accordance with another aspect of the disclosure, a vehicle may include a wireless communication circuit, an inertial sensor, a processor operatively connected to the wireless communication circuit and the inertial sensor, and a memory operatively connected to the processor. The memory may store one or more instructions that, when executed, cause the processor to obtain first movement information of a first external electronic device from the first external electronic device within the vehicle, using the wireless communication circuit, to estimate a first movement parameter of the first external electronic device generated by the specified rotation, from the first movement information when a specified rotation of the vehicle is detected using the inertial sensor, and to compare the first movement parameter with a reference value to estimate a position of the first external electronic device within the vehicle.

In accordance with another aspect of the disclosure, an operation method of an electronic device for determining a position of a first external electronic device within a vehicle may include monitoring movement of the vehicle, using a motion sensor of the electronic device, obtaining first movement information of the first external electronic device from the first external electronic device, estimating a first movement parameter of the first external electronic device generated by the specified rotation, from the first movement information when a specified rotation of the electronic device is detected using the motion sensor, and comparing the first movement parameter with a reference value to estimate a position of the first external electronic device within the vehicle.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described with reference to accompanying drawings. However, those of ordinary skill in the art will recognize that modification, equivalent, and/or alternative on various embodiments described herein may be variously made without departing from the scope and spirit of the disclosure.

Figure 1:
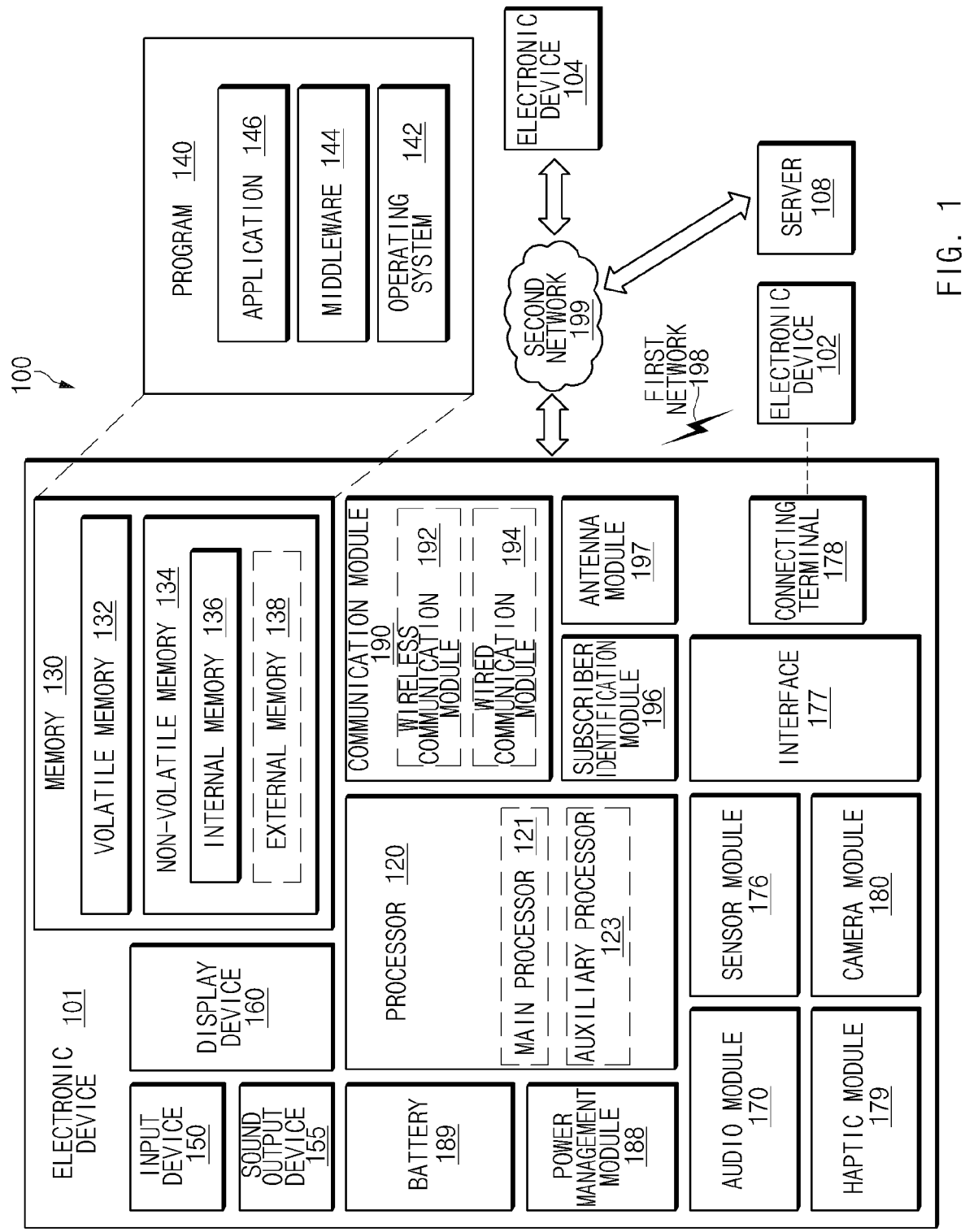
FIG. 1 illustrates a block diagram of an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
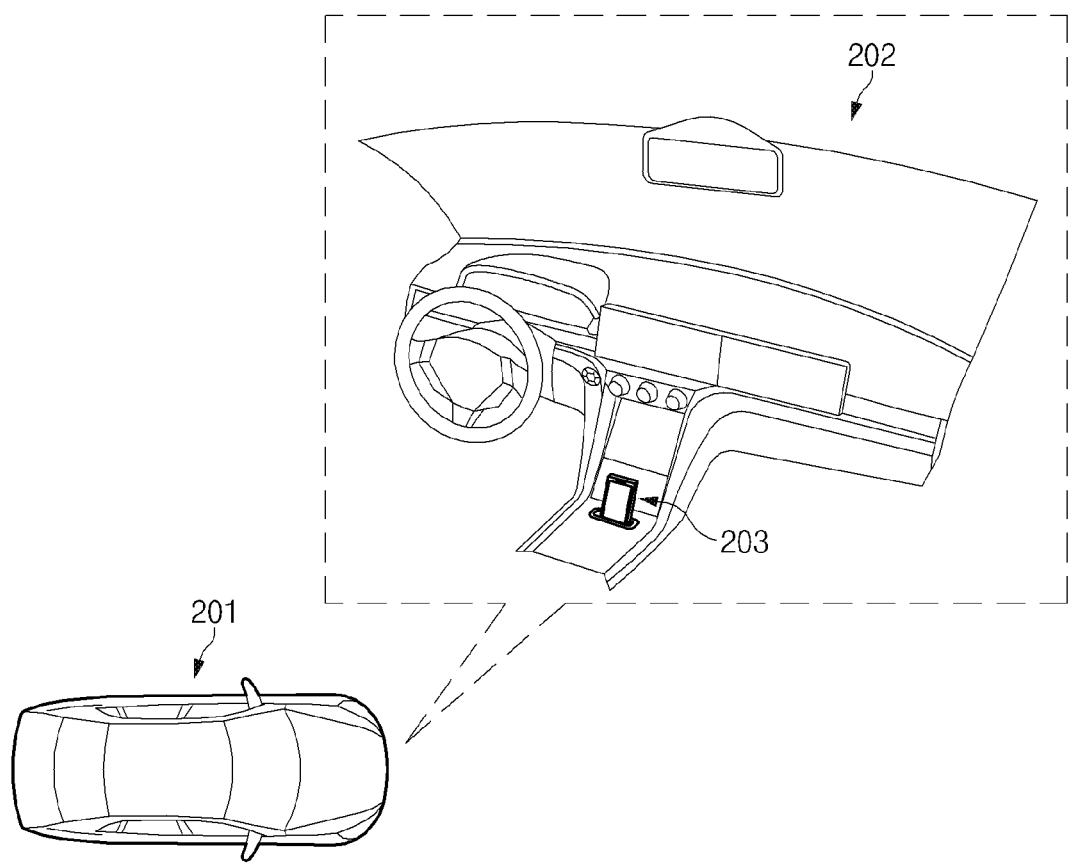
FIG. 2 illustrates a usage environment of a vehicle and electronic devices in the vehicle, according to an embodiment.

FIG. 2 illustrates a usage environment of a vehicle and electronic devices in the vehicle, according to an embodiment.

According to an embodiment, a vehicle 201 may include various electronic devices. For example, the vehicle 201 may include various electronic components. In the following description, all of the electronic components mounted in the vehicle 201 may be referred to as electronic devices of the vehicle 201. The electronic components mounted in the vehicle 201 may include an electronic device capable of being attached to or detached from the vehicle 201.

According to an embodiment, the vehicle 201 may include a vehicle system 202 configured to control various electronic devices in the vehicle 201. For example, the vehicle system 202 may be configured to control at least part of the electronic components mounted in the vehicle 201. For example, the vehicle system 202 may be configured to communicate with at least part of the electronic components mounted in the vehicle 201. For example, the vehicle system 202 may be referred to as a system of electronic devices in the vehicle 201, which is mounted in the vehicle 201 in the normal operating environment of the vehicle 201. The vehicle system 202 may include a device controlling the dynamics of the vehicle 201 or may communicate with a device controlling the dynamics.

According to an embodiment, a user device 203 may be a device that communicates with the vehicle 201 or the vehicle system 202. In FIG. 2, the user device 203 is physically coupled to the vehicle system 202, but embodiments of the disclosure are not limited thereto. The user device 203 may be connected to the vehicle system 202 wirelessly or wiredly. For example, the user device 203 may be a device configured to perform various embodiments described below, using the vehicle 201 or the vehicle system 202. The user device 203 may be a device coupled to the vehicle system 202 in a specified manner. For example, the user device 203 may be an electronic device coupled to a cradle of the vehicle system 202. The user device 203 is illustrated in FIG. 2 as a mobile phone, but embodiments of the disclosure are not limited thereto. For example, the user device 203 may be any portable device capable of communicating with the vehicle system 202.

Figure 3:
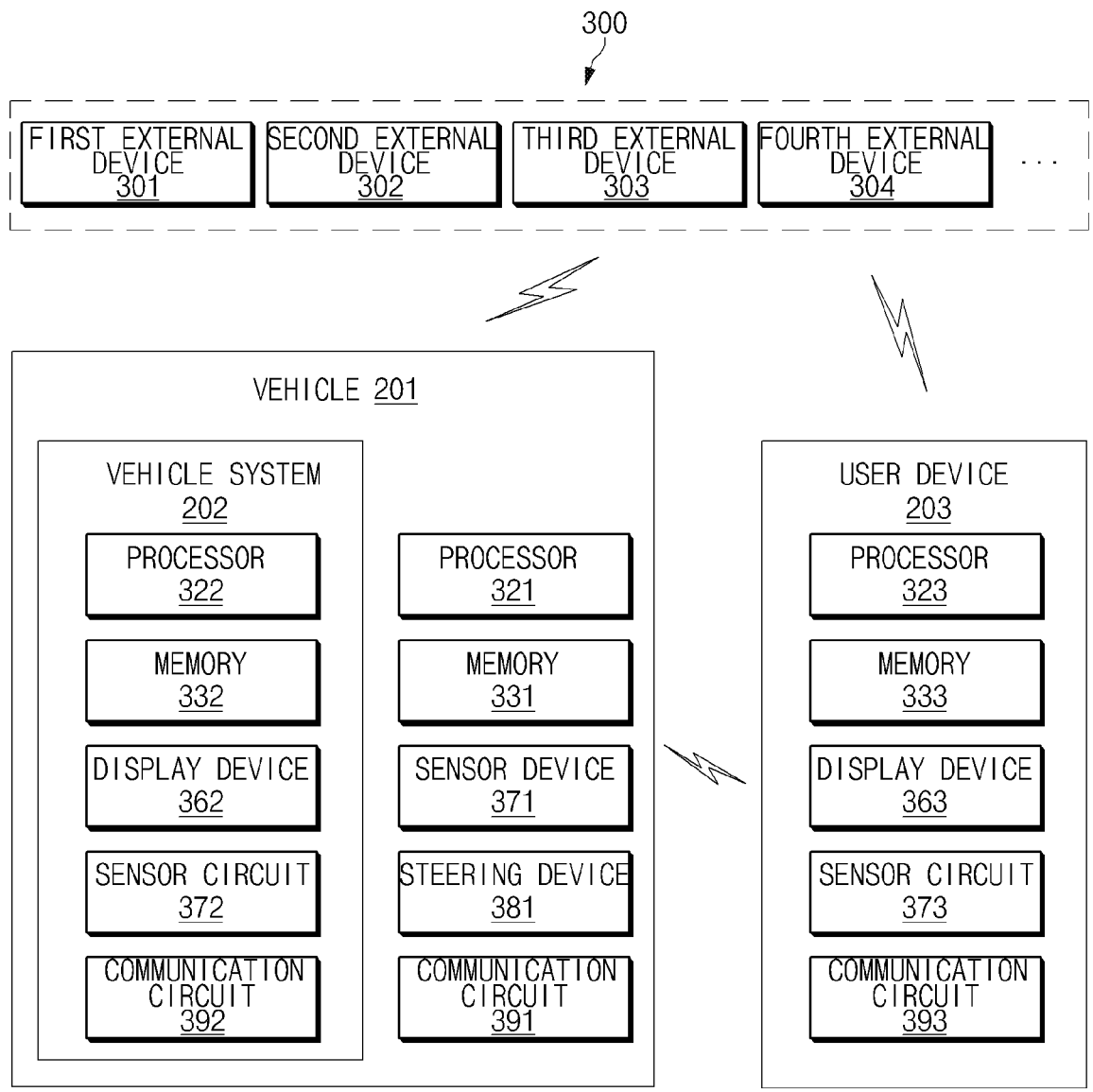
FIG. 3 illustrates a block diagram of a vehicle and other electronic devices in a network environment according to an example.

FIG. 3 illustrates a block diagram of a vehicle and other electronic devices in a network environment 300 according to an example.

According to various embodiments, the vehicle 201 may include the vehicle system 202, a processor 321, a memory 331, a sensor device 371, a steering device 381, and/or a communication circuit 391.

For example, the processor 321 (e.g., the processor 120 of FIG. 1) may be configured to control the dynamics of the vehicle 201 and may be configured to control various electronic devices of the vehicle 201. The processor 321 may be configured to perform various operations of the vehicle 201 described later, based on one or more instructions stored in the memory 331 (e.g., the memory 130 of FIG. 1).

For example, the sensor device 371 (e.g., the sensor module 176 of FIG. 1) may include at least one sensor for sensing various states (e.g., the states of dynamics of the vehicle 201 and the surrounding environment of the vehicle 201) of the vehicle 201. For example, the sensor device 371 may include an inertial sensor (e.g., an accelerometer, a gyroscope, and/or a magnetometer), a speedometer, a thermometer, and/or a steering meter. The inertial sensor may be implemented with an accelerometer and a gyroscope or may be implemented with an accelerometer, a gyroscope, and a magnetometer. For example, the accelerometer may be a sensor that measures acceleration acting on three axes (e.g., x, y, and z) and may measure, estimate, and/or detect the force being applied to the corresponding device, using the measured acceleration. When there is no movement, the accelerometer may output a value corresponding to the gravitational acceleration. When a device equipped with the accelerometer moves, the accelerometer may output the amount of change in force based on vibration caused by the movement of the device, i.e., the amount of change in acceleration. The gyroscope may be a sensor that measures the angular velocity acting on three axes (e.g., x, y, and z) and may measure the rotation amount for each axis of the device equipped with the gyroscope, using information about the measured angular velocity of each axis. The magnetometer may measure the geomagnetic vector for three axes (e.g., x, y, and z) and may measure the azimuth using the magnitude and direction of the geomagnetic vector. For example, the magnetometer may measure magnetic north-based azimuth based on the magnetic field on the earth.

For example, the steering device 381 may include a means for receiving a user input to control the traveling direction of the vehicle 201 and/or a means for changing a vehicle axis. The driver of the vehicle 201 may change the traveling direction of the vehicle 201 by controlling the steering device 381.

For example, the communication circuit 391 may be a communication interface for communicating with other electronic devices inside the vehicle 201 and/or other electronic devices adjacent to the vehicle 201 wiredly or wirelessly. The communication circuit 391 may be a communication interface supporting a controller area network (CAN). The communication circuit 391 may be a communication interface configured to support short-range wireless communication (e.g., BLUETOOTH, WIFI, NFC, and/or 802.11-series short-range wireless communication).

According to various embodiments, the vehicle system 202 may include a processor 322, a memory 332, a display device 362, a sensor circuit 372, and/or a communication circuit 392.

For example, the processor 322 (e.g., the processor 120 of FIG. 1) may be configured to control various configurations of the electronic devices and the vehicle system 202 of the vehicle 201. The processor 322 may be configured to perform various operations of the vehicle 201 and/or the vehicle system 202 described later, based on one or more instructions stored in the memory 332 (e.g., the memory 130 of FIG. 1). For example, the processor 322 and/or the memory 332 of the vehicle system 202 may be integrally implemented with the processor 321 and/or the memory 331 of the vehicle 201. For another example, the processor 321 and/or the memory 331 of the vehicle 201 may be omitted.

For example, the display device 362 (e.g., the display device 160 of FIG. 1) may include at least one display. The display device 362 may include a cluster (e.g., an instrument panel) capable of displaying information associated with driving information of the vehicle 201, a center information display (CID), and/or a head up display (HUD). For example, the display of the display device 362 may be a display configured to receive a touch input.

For example, the sensor circuit 372 (e.g., the sensor module 176 of FIG. 1) may include at least one sensor for sensing various states (e.g., the states of dynamics of the vehicle 201 and the surrounding environment of the vehicle 201) of the vehicle 201. For example, the sensor circuit 372 may include an inertial sensor (e.g., an accelerometer, a gyroscope, and/or a magnetometer), a speedometer, a thermometer, and/or a steering meter. At least part of the sensor circuit 372 may be omitted. For example, the vehicle system 202 may obtain various pieces of status information of the vehicle 201 from the sensor device 371 and/or the steering device 381 of the vehicle 201.

For example, the communication circuit 392 may be a communication interface for communicating with other electronic devices inside the vehicle 201 and/or other electronic devices adjacent to the vehicle 201 wiredly or wirelessly. The communication circuit 392 may be a communication interface supporting a controller area network (CAN). The communication circuit 392 may be a communication interface configured to support short-range wireless communication (e.g., BLUETOOTH, WIFI, NFC, and/or 802.11-series short-range wireless communication). The communication circuit 392 may be integrally formed with the communication circuit 391 of the vehicle 201.

According to various embodiments, the user device 203 (e.g., the electronic device 101 in FIG. 1) may include a processor 323, a memory 333, a display device 363, a sensor circuit 373, and/or a communication circuit 393.

For example, the processor 323 (e.g., the processor 120 of FIG. 1) may be configured to control various configurations of the user device 203. The processor 323 may be configured to perform various operations of the user device 203 described later based on one or more instructions stored in the memory 333 (e.g., the memory 130 of FIG. 1).

For example, the display device 363 (e.g., the display device 160 of FIG. 1) may include at least one display. The description of the display device 362 may be referenced by the description of the display device 160 of FIG. 1.

For example, the sensor circuit 373 (e.g., the sensor module 176 of FIG. 1) may include at least one sensor for sensing various states (e.g., the states of dynamics of the user device 203 and the surrounding environment of the user device 203) of the user device 203. For example, the sensor circuit 373 may include an inertial sensor (e.g., an accelerometer, a gyroscope, and/or a magnetometer), a speedometer, a thermometer, and/or a steering meter. At least part of the sensor circuit 373 may be omitted. For example, the user device 203 may obtain various pieces of status information of the vehicle 201 from the vehicle 201 or the vehicle system 202. For example, the user device 203 may receive speed information, acceleration information, inertia information, and/or steering information of the vehicle 201 from the vehicle 201 and/or the vehicle system 202, using the communication circuit 393.

For example, the communication circuit 393 (e.g., the communication module 190 of FIG. 1) may be a communication interface for communicating with the vehicle 201, the vehicle system 202, and/or other electronic devices wiredly or wirelessly.

In an exemplary network environment 300 of FIG. 3, the vehicle 201 (or the vehicle system 202) and the user device 203 may be connected to each other wirelessly or wiredly. The vehicle 201 (or the vehicle system 202) may communicate with a plurality of external devices 301, 302, 303, and 304. The user device 203 may communicate with the plurality of external devices 301, 302, 303, and 304. The vehicle 201 (or the vehicle system 202) and the user device 203 may communicate with the plurality of external devices 301, 302, 303, and 304.

Hereinafter, for convenience of description, the plurality of external devices 301, 302, 303, and 304 may be portable electronic devices positioned inside the vehicle 201. For example, the plurality of external devices 301, 302, 303, and 304 may be temporarily positioned inside the vehicle 201. In an example, at least part of the plurality of external devices 301, 302, 303, and 304 may be a wearable device. For example, each of the plurality of external devices 301, 302, 303, and 304 may have a structure similar to the structure of the electronic device 101 of FIG. 1.

In FIG. 3, at least one of configurations having the same function among the configurations of the vehicle 201 and the vehicle system 202 may be omitted. For example, one of the processor 322 and the processor 321 may be omitted. One of the memory 331 and the memory 332 may be omitted. One of the sensor device 371 and the sensor circuit 372 may be omitted. One of the communication circuit 392 and the communication circuit 391 may be omitted. Hereinafter, for convenience of description, the vehicle 201 and the vehicle system 202 are described separately, but embodiments of the disclosure are not limited thereto. The distinction between the vehicle 201 and the vehicle system 202 is a logical distinction, and the vehicle system 202 may include at least a part of the vehicle 201.

Figure 4:
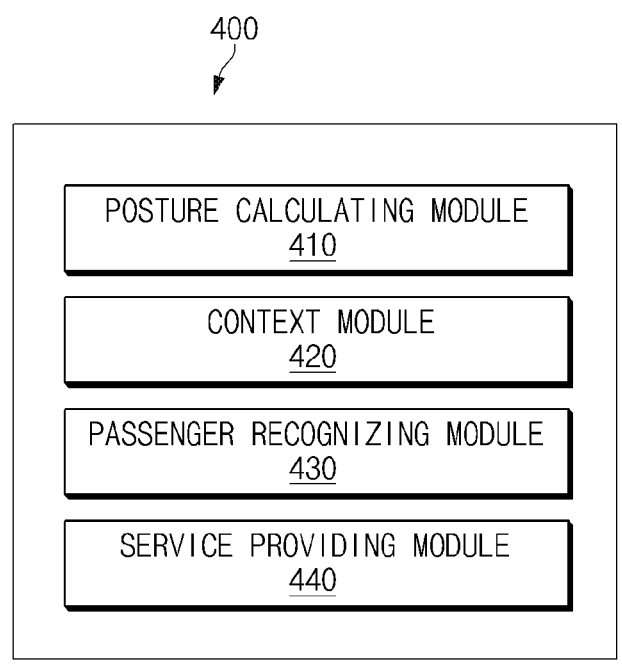
FIG. 4 illustrates a block diagram of a software module according to an embodiment.

FIG. 4 illustrates a block diagram of a software module 400 according to an embodiment.

The software module 400 may be a software module implemented by a processor (e.g., the processor 321 of FIG. 3) of a vehicle (e.g., the vehicle 201 of FIG. 2). The software module 400 may be a software module implemented by a processor (e.g., the processor 322 of FIG. 3) of a vehicle system (e.g., the vehicle system 202 of FIG. 2). The software module 400 may be a software module implemented by the vehicle 201 and the vehicle system 202. The software module 400 may be a software module implemented by a processor (e.g., the processor 323 of FIG. 3) of a user device (e.g., the user device 203 of FIG. 2). For example, a part of the software module 400 may be implemented by the vehicle 201 or the vehicle system 202, and the remaining parts may be implemented by the user device 203.

According to an embodiment, the software module 400 may include a posture calculating module 410, a context module 420, a passenger recognizing module 430, and/or a service providing module 440.

According to an embodiment, the posture calculating module 410 may determine the posture (e.g., orientation) of an external electronic device (e.g., the external devices 301, 302, 303, and 304 of FIG. 3) and/or the vehicle 201. The posture calculating module 410 may determine the posture of the associated device (e.g., an external electronic device and/or the vehicle 201), using acceleration, angular velocity, and/or geomagnetic information. For example, the posture calculating module 410 may estimate a game rotation vector (GRV) based on acceleration and angular velocity and may determine a relative posture of the associated device based on the estimated GRV. For example, the posture calculating module 410 may estimate a rotation vector (RV), using acceleration, angular velocity, and geomagnetic information and may determine the posture for the true north direction of the associated device based on the estimated RV. The posture calculating module 410 may complementarily correct an error in sensor information, using acceleration, angular velocity, and/or geomagnetic information.

According to an embodiment, the context module 420 may determine the state of a user, using various pieces of sensor information (e.g., information obtained from the sensor of the vehicle 201, the vehicle system 202, the user device 203, and/or an external electronic device). For example, the context module 420 may train the pattern of data collected from various sensors and may determine the user's state, using the collected sensor information and the trained pattern. For example, the context module 420 may determine whether a device (or a user) associated with a sensor is stopped or moved, using the collected sensor information. For another example, the context module 420 may determine whether a movement pattern of an associated user corresponds to a driving pattern, based on the movement pattern indicated by the collected sensor information.

According to an embodiment, the passenger recognizing module 430 may determine a position of the electronic device (e.g., the external devices 301, 302, 303, and 304 of FIG. 3) in the vehicle 201. For example, the passenger recognizing module 430 may detect the rotation of the vehicle 201, using the inertial sensor value of the vehicle 201, the vehicle system 202, or the user device 203 and may estimate the speed of the electronic device in the vehicle 201, using centripetal acceleration by rotation. For example, the passenger recognizing module 430 may determine a position of the corresponding electronic device in the vehicle 201, based on the estimated speed. For example, the passenger recognizing module 430 may determine a position of the corresponding electronic device in the vehicle 201, using the estimated speed and context information (e.g., context information estimated by the context module 420) of the corresponding electronic device.

According to an embodiment, the service providing module 440 may provide a service based on the determined position of the electronic device. For example, when it is determined that the electronic device is positioned in a driver's seat, the service providing module 440 may provide a service corresponding to a driver, using the vehicle 201 or the electronic device. The service providing module 440 may identify an electronic device positioned in the driver's seat to identify that a user of the electronic device is a driver. The service providing module 440 may provide a service to a user identified as a driver. For example, the service providing module 440 may provide traffic information through the identified electronic device. For another example, the service providing module 440 may control the seat of the vehicle 201 or may adjust the height of the HUD of the vehicle 201 so as to be suitable for the identified driver. For another example, the service providing module 440 may output media, using a media output device (e.g., a display and/or a speaker) of the vehicle 201 corresponding to the identified position of the electronic device. The service providing module 440 may identify that a user of the electronic device is a fellow passenger, based on the position of the electronic device. The service providing module 440 may provide a service to the user identified as a fellow passenger. For example, the service providing module 440 may provide information different from traffic information such as music, through the identified electronic device. For another example, the service providing module 440 may output media, using a media output device (e.g., a display and/or a speaker) of the vehicle 201 corresponding to the identified position of the electronic device.

Hereinafter, operations of the software module 400 will be described with reference to FIGS. 5 to 8.

Figure 5:
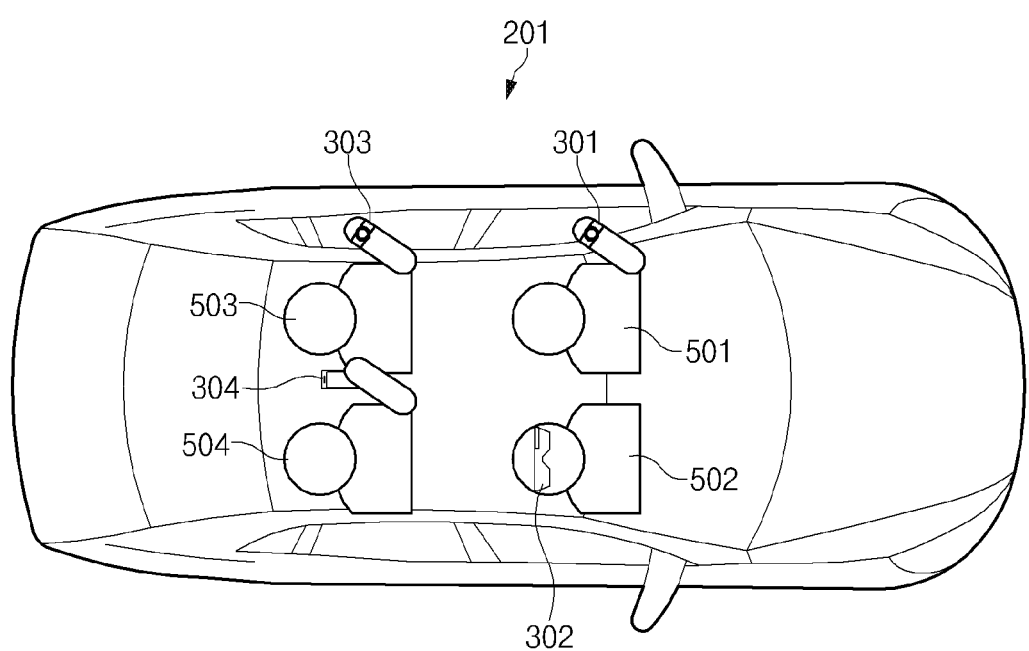
FIG. 5 illustrates an environment, in which a plurality of users board in a vehicle, according to an embodiment.

FIG. 5 illustrates a boarding environment of a plurality of users in the vehicle 201, according to an embodiment.

Hereinafter, methods for determining the position of an electronic device in the vehicle 201 will be described with reference to the boarding environment of FIG. 5. Referring to FIG. 5, a first user 501, a second user 502, a third user 503, and a fourth user 504 may board the vehicle 201.

The first user 501 may be associated with the first external device 301. For example, the first external device 301 may be a smart watch (e.g., Galaxy Watch™). The first user 501 may be a driver of the vehicle 201. For example, the vehicle 201 may have a driver's seat at the position of the first user 501. The driver's position may be exemplary, and the driver's position may differ depending on countries. For another example, in a country, the position of the second user 502 may be the position of the driver. Hereinafter, for convenience of description, unless otherwise described, it may be assumed that the first user 501 is the driver of the vehicle 201.

The second user 502 may be associated with the second external device 302. For example, the second external device 302 may be a smart glass. The second user 502 may be a user, which is positioned next to the driver (e.g., the first user 501) and which boards the same row as the driver.

The third user 503 may be associated with the third external device 303. For example, the third external device 303 may be a smart watch. The third user 503 may be a user boarding a position behind the driver (e.g., the first user 501).

The fourth user 504 may be associated with the fourth external device 304. For example, the fourth external device 304 may be a mobile phone. The fourth user 504 may be a user boarding in a diagonal direction from the driver.

The users 501, 502, 503, and 504 are merely for illustrating the positions of users in the vehicle 201, and at least part of the users 501, 502, 503, and 504 does not board the vehicle 201. The shapes of the first external device 301, the second external device 302, the third external device 303, and the fourth external device 304 are exemplary, and embodiments of the disclosure are not limited thereto.

Figure 6:
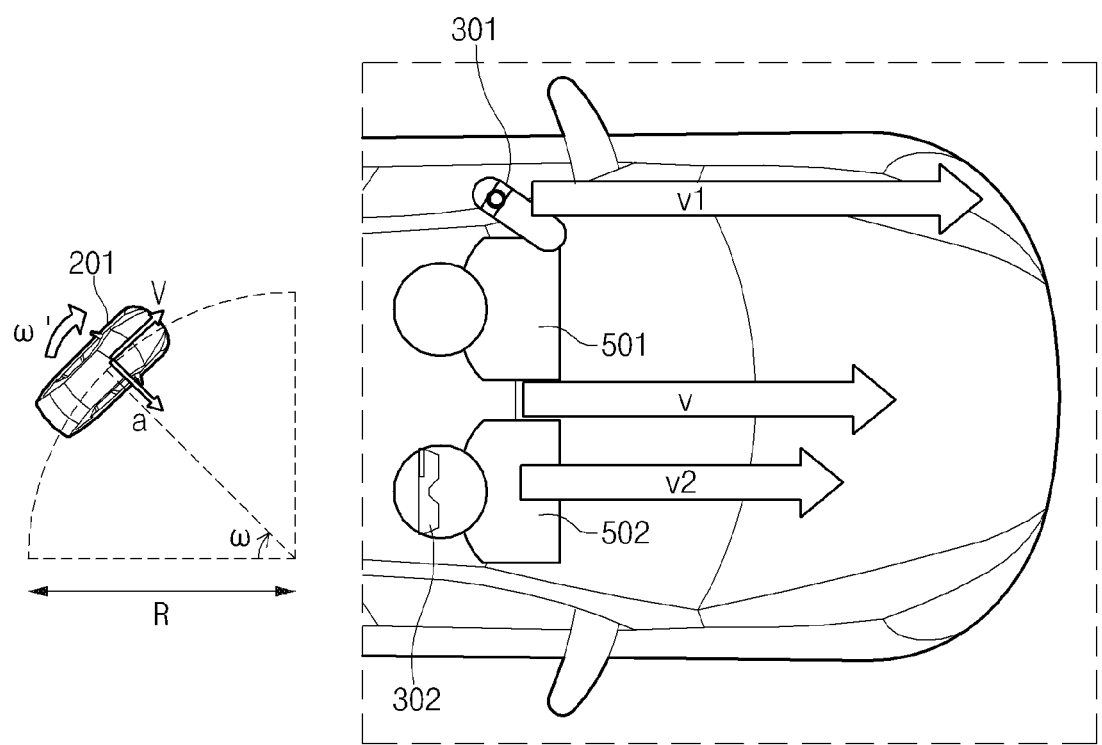
FIG. 6 illustrates a view for describing a position determination of electronic devices in a vehicle according to an embodiment.

FIG. 6 illustrates a view for describing position determination of electronic devices in the vehicle 201 according to an embodiment.

According to various embodiments, a passenger recognizing module (e.g., the passenger recognizing module 430 of FIG. 4) may detect the rotation of the vehicle 201 and may determine positions of the external devices in the vehicle 201 based on movement information obtained by the external devices when the vehicle 201 rotates.

Referring to FIGS. 5 and 6, for example, the vehicle 201 may have rotational movement. In the example of FIG. 6, the vehicle 201 may turn to the right. For example, the vehicle 201 may rotate depending on the rotation radius having a radius R. In this case, the velocity 'v' of the vehicle 201 may correspond to the product of the angular velocity $\omega$ of the vehicle and the rotation radius R. Furthermore, the centripetal acceleration 'a' of the vehicle 201 may be denoted as $\omega^2 R$. For example, when the angular velocity observed in the vehicle 201 is $\omega'$, the velocity of the vehicle 201 or the electronic device in the vehicle 201 may be obtained by dividing the centripetal acceleration 'a' by the observed angular velocity $\omega'$. The angular velocity observed in the vehicle 201 may be the same, and thus the velocity of the electronic device in the vehicle 201 may be proportional to the distance from the center of the rotation radius R.

When the vehicle 201 turns to the right at a velocity 'v', the angular velocity experienced by the first external device 301 and the second external device 302 may be the same as $\omega'$. However, because the second external device 302 is closer to the center of the rotation radius R than the first external device 301, the magnitude of centripetal acceleration observed by the second external device 302 may be smaller than the magnitude of centripetal acceleration observed by the first external device 301.

For example, a passenger recognizing module (e.g., the passenger recognizing module 430 in FIG. 4) may compare the detected centripetal acceleration observed by the first external device 301 and the second external device 302 when the vehicle 201 rotates, and then may identify that the first external device 301 is an electronic device positioned at the outside further than the second external device 302 in the direction of rotation.

For another example, the passenger recognizing module 430 may compare the reference value with the detected centripetal acceleration observed by the first external device 301 and the second external device 302 when the vehicle 201 rotates. The reference value may be the value of the velocity set depending on the rotational velocity of the vehicle 201, the velocity of the vehicle 201 measured by the vehicle 201, or the velocity of the vehicle 201 estimated from a sensor of the vehicle 201. For example, when the vehicle 201 turns to the right, the passenger recognizing module 430 may identify that the first external device 301 is relatively positioned outside the rotation radius, based on the estimated velocity of the first external device 301 having a velocity v1 greater than the reference value 'v'. When the vehicle 201 turns to the right, the passenger recognizing module 430 may identify that the second external device 302 is relatively positioned inside the rotation radius, based on the estimated velocity of the second external device 302 having a velocity v2 less than the reference value 'v'.

For another example, the passenger recognizing module 430 may compare the detected centripetal accelerations observed by the first external device 301 and the second external device 302 when the vehicle 201 rotates. For example, when the vehicle 201 turns to the right, the passenger recognizing module 430 may identify that the first external device 301 is relatively positioned outside the rotation radius compared with the second external device 302, based on the estimated velocity v1 of the first external device 301 having a velocity greater than the velocity v2 of the second external device 302. When the vehicle 201 turns to the right, the passenger recognizing module 430 may identify that the second external device 302 is relatively positioned inside the rotation radius compared with the first external device 301, based on the estimated velocity of the second external device 302 having the velocity v2 lower than the velocity v1 of the first external device.

Similarly, when the vehicle 201 turns to a left at the velocity 'v', the angular velocity experienced by the first external device 301 and the second external device 302 may be the same as $\omega'$. However, because the first external device 301 is closer to the center of the rotation radius than the second external device 302, the magnitude of centripetal acceleration observed by the second external device 302 may be greater than the magnitude of centripetal acceleration observed by the first external device 301.

According to various embodiments, when a specified rotation of the vehicle 201 is detected, the passenger recognizing module 430 may determine the position of an external device positioned in the vehicle 201. For example, when the angular velocity by the rotation of the vehicle 201 is less than a specified value (e.g., 10 degree/sec), the difference in centripetal acceleration measured by the first external device 301 and the second external device 302 may be very small. When the angular velocity due to the rotation of the vehicle 201 is not less than a specified value, the passenger recognizing module 430 may determine positions of electronic devices in the vehicle 201; when the angular velocity is less than the specified value, the passenger recognizing module 430 may not determine the positions. According to an embodiment, the passenger recognizing module 430 may detect the specified rotation based on sensor information (e.g., sensor information of the vehicle 201, the vehicle system 202, or the user device 203) or the steering information and velocity of the vehicle 201. For example, the passenger recognizing module 430 may detect the specified rotation of the vehicle 201, using a gyroscope or an inertial sensor. For another example, the passenger recognizing module 430 may detect the specified rotation based on the traveling direction of the vehicle 201 estimated from the steering device of the vehicle 201, and the velocity (e.g., the velocity measured by a speedometer) of the vehicle 201.

Figure 7:
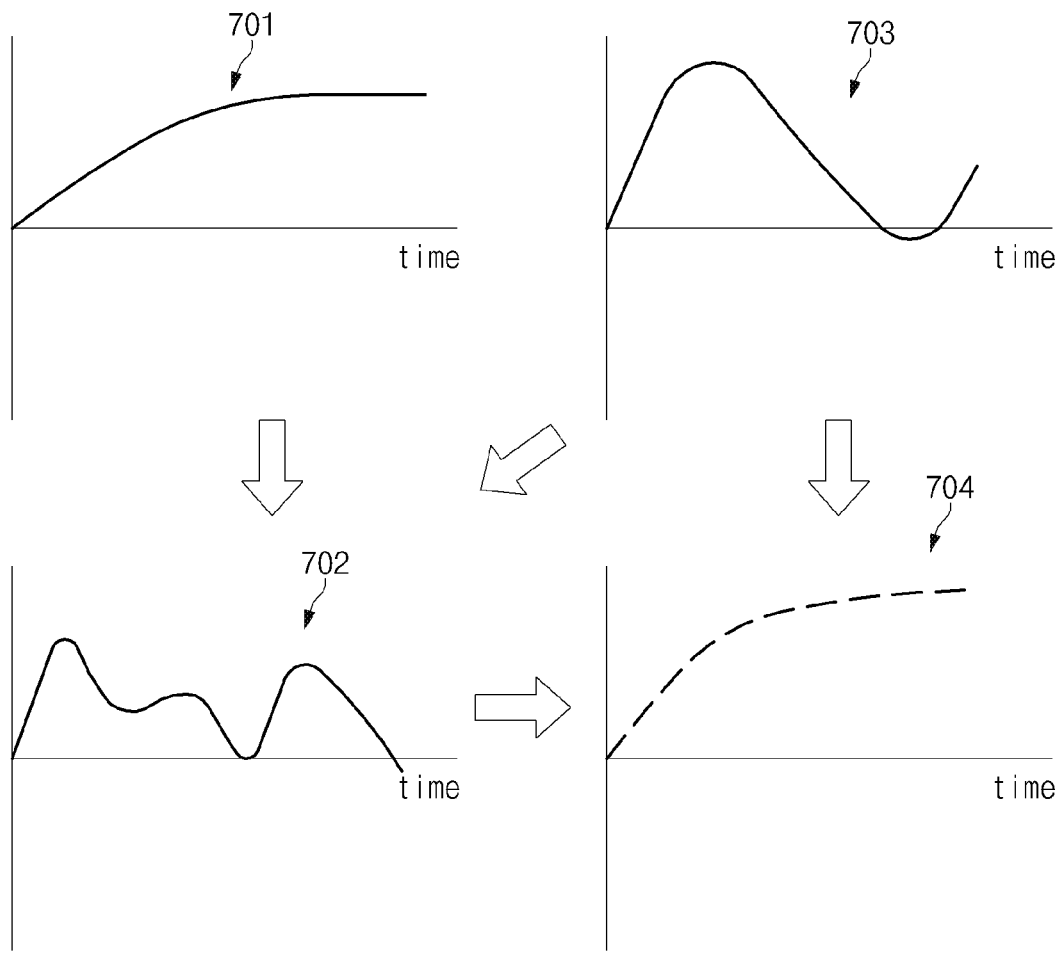
FIG. 7 illustrates sensor data processing according to one embodiment.

FIG. 7 illustrates sensor data processing according to one embodiment.

According to various embodiments, a passenger recognizing module (e.g., the passenger recognizing module 430 of FIG. 4) may determine the position in the vehicle 201 based on the reliability of sensor data (e.g., the data measured by an inertial sensor of an external device) from an external device (e.g., the first external device 301, the second external device 302, the third external device 303, and/or the fourth external device 304 of FIG. 5). For example, only when the reliability of sensor data is not less than the specified value, the passenger recognizing module 430 may perform position determination; when the reliability of sensor data is less than the specified value, the passenger recognizing module 430 may discard the sensor data. When the specified rotation of the vehicle 201 is detected, the passenger recognizing module 430 may identify the reliability of sensor data.

According to an embodiment, the passenger recognizing module 430 may identify the reliability of sensor data from an external device based on a type of external device. The external devices may be divided into stationary devices and non-stationary devices based on the type of external device. For example, an electronic device worn on a portion (e.g., a hand, an arm, or the like) of a user's body having relatively a lot of movement or carried by the portion having relatively a lot of movement may be a non-stationary device. An electronic device worn on a portion (e.g., a head, a waist, or the like) of the user's body having relatively little movement or carried by the portion having relatively little movement may be a stationary device. For example, an electronic device such as a smart watch and/or a mobile phone may be classified as a non-stationary device. An electronic device such as smart glasses and/or a smart pin may be classified as a stationary device. The passenger recognizing module 430 may determine that the reliability of sensor data from a stationary device is higher than the reliability of the sensor data from a non-stationary device.

According to an embodiment, the passenger recognizing module 430 may identify the reliability of sensor data from an external device, using the posture calculating module 410 and/or the context module 420. For example, the posture calculating module 410 and/or the context module 420 may determine the amount of movement of the external device and/or the movement state of the external device, based on the sensor data from the external device. When the amount of movement of the external device is less than the specified amount (e.g., when the external device is relatively stationary), the passenger recognizing module 430 may determine that sensor data from the external device has high reliability. When the amount of movement of the external device is not less than the specified amount (e.g., when the external device is relatively non-stationary), the passenger recognizing module 430 may determine that sensor data from the external device has low reliability.

According to an embodiment, the context module 420 and/or the passenger recognizing module 430 may process and use sensor data received from the external device. For example, the first graph 701 may represent the features of dynamics of the vehicle 201 detected by the vehicle 201, the vehicle system 202, or the user device 203. The third graph 703 may represent the features of dynamics of the external device detected by the external device. Because the external device is positioned within the vehicle 201, when the features of dynamics (e.g., the first graph 701) of the vehicle 201 are removed from the features of dynamics (e.g., the third graph 703) of the external device, the features of dynamics of a user (e.g., a user associated with the external device) as illustrated in the second graph 702 may be estimated. For example, the context module 420 may determine the stationary/non-stationary state of an external device based on the estimated features of the dynamics of the user. When the features of dynamics (e.g., the second graph 702) of the user are removed from the features of dynamics (e.g., the third graph 703) of the external device, the calibrated features of dynamics of the external device as illustrated in the fourth graph 704 may be estimated. The calibrated features of dynamics of the external device may be obtained by removing the features of dynamics of the user from the features of dynamics of the external device observed by the external device.

According to an embodiment, the context module 420 and/or the passenger recognizing module 430 may synchronize various pieces of sensor data in a time domain. For example, the context module 420 and/or the passenger recognizing module 430 may synchronize the sensor data detected by the external device, the vehicle 201, the vehicle system 202, and/or the user device 203 in the time domain, using time information (e.g., time stamp included in sensor information). The context module 420 and/or the passenger recognizing module 430 may process various pieces of sensor data synchronized in the time domain.

When the reliability of sensor data is not less than the specified value, the passenger recognizing module 430 may perform velocity estimation of the external device, using at least a partial interval (e.g., speed estimation confidence interval) of the sensor data of the external device. According to various embodiments, the passenger recognizing module 430 may detect a speed estimation confidence interval for estimating the speed of an external device, using an inertial sensor (e.g., a gyroscope) and/or speedometer. When the vehicle 201 rotates at a constant speed, the passenger recognizing module 430 may more accurately estimate a position. The speed estimation confidence interval may include a time interval during which the vehicle 201 rotates at constant speed. For example, the passenger recognizing module 430 may determine that the vehicle 201 is rotating at a constant speed, when the variance value of the 3-axis angular acceleration is less than the second value (e.g., specified variance value). For another example, when the vehicle 201 is rotating and the amount of change in velocity (e.g., the velocity measured by a speedometer) of the vehicle 201 is within a specified range, the passenger recognizing module 430 may determine that the vehicle 201 is rotating at a constant speed, using an inertial sensor.

According to various embodiments, the passenger recognizing module 430 may determine a position of an external device in the vehicle 201, using sensor data in a speed estimation confidence interval among sensor data (e.g., the calibrated features of dynamics of an external device). The passenger recognizing module 430 may estimate the rotational velocity measured by the external device using the calibrated features of dynamics of the external device and may determine a position of the external device in the vehicle 201 based at least partly on the estimated rotational velocity.

According to various embodiments, the passenger recognizing module 430 may determine the position of the external device in the vehicle 201, using sensor data and context information of the external device. Referring to FIG. 5, because the first user 501 and the third user 503 have the same rotation radius when the vehicle 201 is rotated, the estimated velocities of the first external device 301 and the third external device 303 may be substantially the same as each other. According to an embodiment, the passenger recognizing module 430 may identify the first user 501 and the third user 503 using context information. For example, the features of dynamics (e.g., the features of dynamics of the first user 501 measured by the first external device 301) of the first external device 301 of the first user 501 may have the features of dynamics (e.g., movement features appearing in a driving operation such as a steering operation and a gear operation) of a driver. The passenger recognizing module 430 may determine that the first user 501 among the first user 501 and the third user 503 is the driver, using the first external device 301 that is based on the features of dynamics of the first external device 301.

According to various embodiments, the passenger recognizing module 430 may determine the position of the external device in the vehicle 201, using sensor data and additional information of the external device. Referring to FIG. 5, because the first user 501 and the third user 503 have the same rotation radius when the vehicle 201 is rotated, the estimated velocities of the first external device 301 and the third external device 303 may be substantially the same as each other. Similarly, because the second user 502 and the fourth user 504 have the same rotation radius when the vehicle 201 is rotated, the estimated velocities of the second external device 302 and the fourth external device 304 may also be substantially the same as each other. For example, the passenger recognizing module 430 may identify the first and third users 501 and 503 or the second and fourth users 502 and 504, using additional information. For example, the communication circuit of the vehicle 201, the vehicle system 202, or the user device 203 configured to communicate with the external device 301, 302, 303, and/or 304 may be positioned at the front side of the vehicle 201. In this case, the distance between the front row (e.g., positions where the first user 501 and the second user 502 are placed) of the vehicle 201 and the communication circuit may be shorter than the distance between the rear row (e.g., positions where the third user 503 and the fourth user 504 are placed) of the vehicle 201 and the communication circuit.

According to an embodiment, the passenger recognizing module 430 may identify the first and third external devices 301 and 303 or the second and fourth external devices 302 and 304, based on a signal response time (e.g., round trip time (RTT)). For example, the RTT experienced by the communication circuit while the communication circuit communicates with an external device may differ depending on the position of the external device. For example, the communication circuit may estimate the RTT by transmitting a signal to the external device and receiving a response signal from the external device. For another example, the communication circuit may estimate the RTT by receiving a response signal including a time stamp (e.g., transmission time information of the response signal) from an external device. In the example of FIG. 5, the RTT associated with the third external device 303 may be longer than the RTT associated with the first external device 301. Similarly, the RTT associated with the fourth external device 304 may be longer than the RTT associated with the second external device 302.

According to an embodiment, the passenger recognizing module 430 may identify the first and third external devices 301 and 303 or the second and fourth external devices 302 and 304, based on the reception strength of the signal (e.g., received signal strength indicator (RSSI)). For example, the reception strength of the signal received from the external device by the communication circuit may be different depending on the position of the external device. For example, the communication circuit may estimate the RSSI by receiving a signal from the external device. For another example, the communication circuit may receive a signal including RSSI information estimated by the external device from the external device. In the example of FIG. 5, the RSSI associated with the third external device 303 may be smaller than the RSSI associated with the first external device 301. Similarly, the RSSI associated with the fourth external device 304 may be smaller than the RSSI associated with the second external device 302.

According to an embodiment, the passenger recognizing module 430 may identify the first and third external devices 301 and 303 or the second and fourth external device 302 and 304, based on proximity distance measurement. For example, the passenger recognizing module 430 may determine the position of the external device in the vehicle 201 by measuring the distance from the external device using the proximity distance measurement sensor positioned in the vehicle 201 or the vehicle system 202. For example, the proximity distance measurement sensor may include an electromagnetic (EM) sensor. For another example, the proximity distance measurement sensor may include a communication circuit capable of measuring a distance from an external electronic device, using a signal (e.g., the signal having a frequency of about 60 GHz) according to the Wi-Fi protocol in mmWave band or an ultra-wide band (UWB) signal.

According to various embodiments, the passenger recognizing module 430 may determine the position of the external device in the vehicle 201, using sensor data, context information, and additional information (e.g., reception signal strength or reception signal response time) of the external device.

According to various embodiments, the passenger recognizing module 430 may determine whether a user associated with the external device is a driver, based at least partly on the identified position of the external device. For example, when the identified position of the external device corresponds to the driver's seat of the vehicle 201, the passenger recognizing module 430 may determine that a user of the corresponding external device is a driver. For another example, the passenger recognizing module 430 may determine whether a user associated with the external device is a driver, using the identified position of the external device and the context information (and/or additional information).

Figure 8:
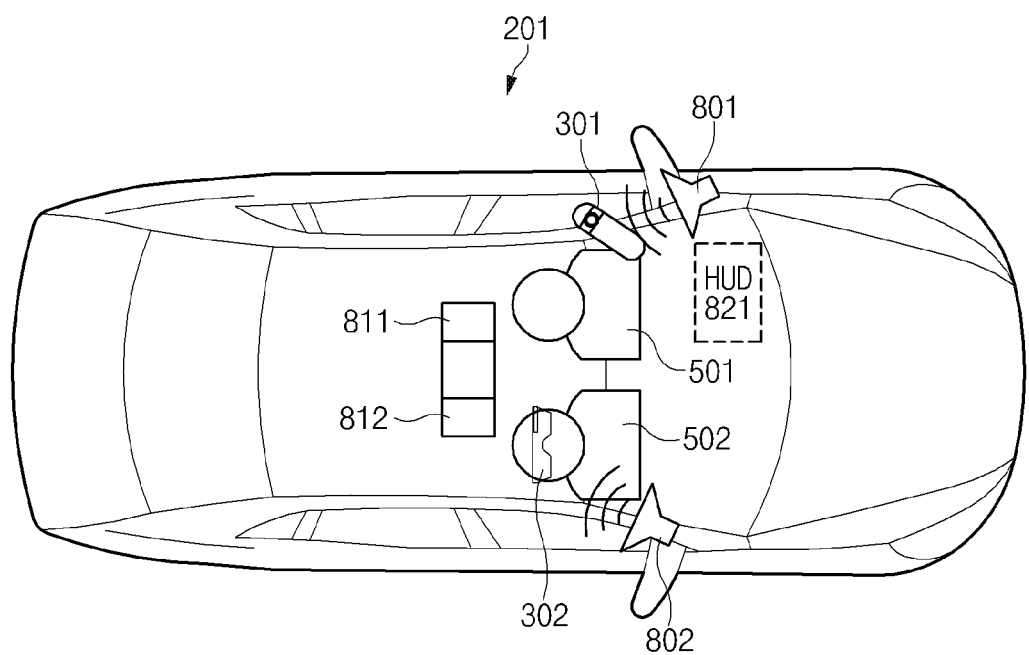
FIG. 8 illustrates examples of a position-based service according to an embodiment.

FIG. 8 illustrates examples of a position-based service according to an embodiment.

According to an embodiment, the service providing module (e.g., the service providing module 440 of FIG. 4) may provide a service based on the position of the identified user (or the associated external device). According to an embodiment, the service providing module 440 may provide a service based on preference information of the identified user and the user's role (e.g., a driver or a fellow passenger). For example, the service providing module 440 may store the trained or obtained preference information of the user. The preference information may include information associated with settings of the user's vehicle 201. Referring to FIG. 8, when the first user 501 is identified as a driver, the service providing module 440 may adjust the height and/or brightness of HUD 821 to be suitable for the preferences of the first user 501. For another example, the service providing module 440 may change the shape of the driver's seat depending on the preferences of the first user 501. For still another example, the service providing module 440 may provide traffic-related voice information to the first user 501 identified as the driver through a first speaker 801 and may provide sound content to the second user 502 identified as a fellow passenger through a second speaker 802 adjacent to the second user 502. According to an embodiment, the service providing module 440 may provide a service based on the identified user's role and context information of the user. For example, the first user 501 may be identified as a driver, and the second user 502 may be identified as a fellow passenger. The service providing module 440 may detect the context information of the first user 501, using the first external device 301 associated with the first user 501. The context module 420 may detect that the first user 501 is asleep, based on heart rate information and/or movement information of the first user 501 detected by the first external device 301. For example, when it is detected that the first user 501 identified as a driver is asleep during driving, the service providing module 440 may provide an alarm, using a speaker (e.g., the first speaker 801 and/or the second speaker 802). When it is detected that the first user 501 identified as the driver is asleep during driving, the service providing module 440 may provide an alarm by flashing on and off a first interior light 811 on a driver side. For another example, when it is detected that the second user 502 identified as a fellow passenger is asleep, the service providing module 440 may reduce the volume of the speaker (e.g., the first speaker 801 and/or the second speaker 802). When it is detected that the second user 502 identified as a fellow passenger is asleep, the service providing module 440 may reduce the brightness of a second interior light 812 on the side of the second external device 302 or may turn off the second interior light 812. When it is detected that the second user 502 identified as a fellow passenger is asleep, the service providing module 440 may lower a curtain (not illustrated) of a window adjacent to the second user 502.

Figure 9:
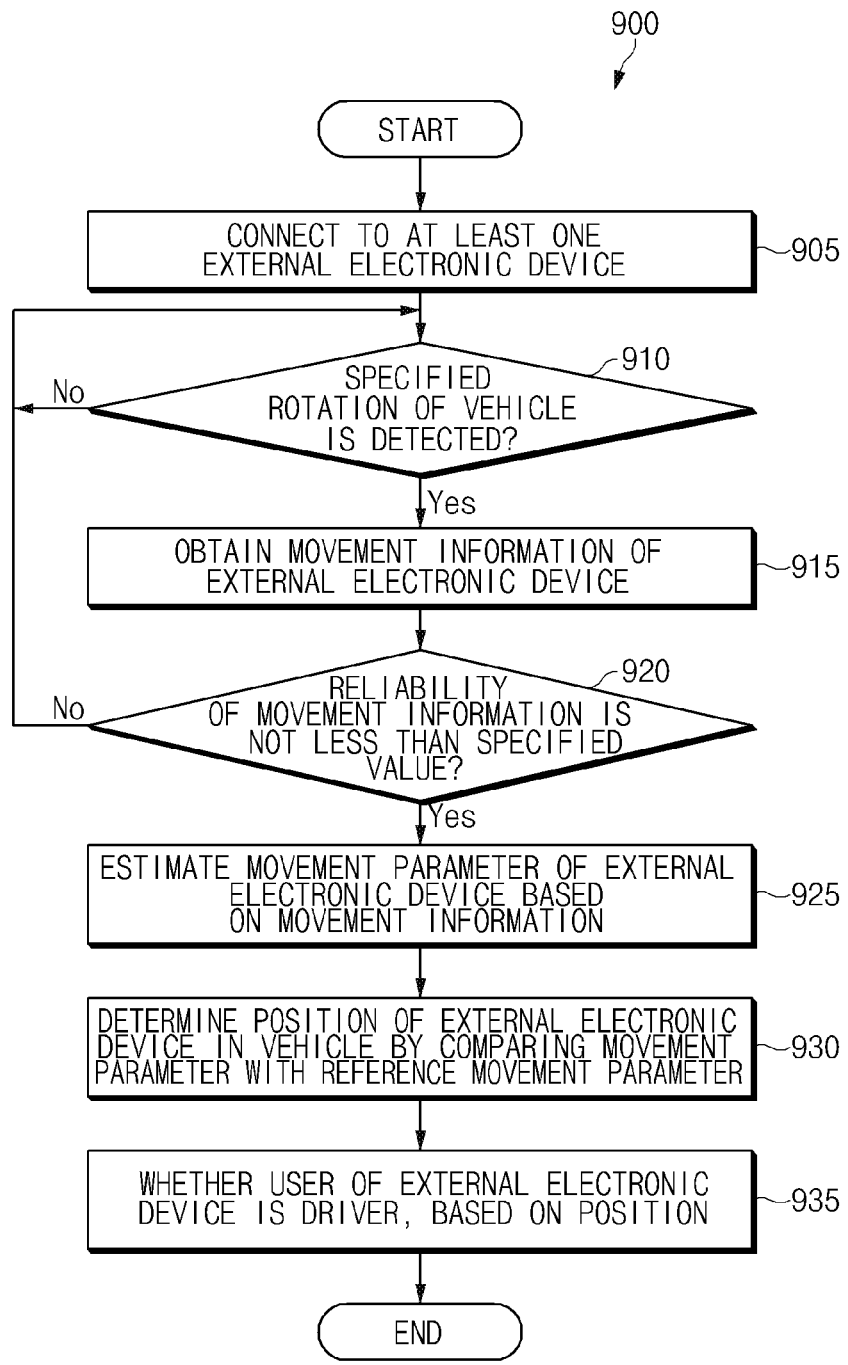
FIG. 9 illustrates a flowchart of a method for determining a driver according to an embodiment.

FIG. 9 illustrates a flowchart 900 of a method for determining a driver according to an embodiment.

For example, the driver determining method of FIG. 9 may be performed by the vehicle 201. Hereinafter, a method of providing a service by the vehicle 201 may be described with reference to FIGS. 3 and 9. Hereinafter, the operations of the processor 321 may be operations performed by the processor 321 when one or more instructions stored in the memory 331 are executed by the processor 321.

In operation 905, the processor 321 may connect to at least one external electronic device (e.g., the first external device 301, the second external device 302, the third external device 303, and/or the fourth external device 304) using the communication circuit 391. For example, the processor 321 may connect to at least one external electronic device based on short-range wireless communication such as V2D, BLUETOOTH, WIFI, and/or NFC, using the communication circuit 391. When the communication circuit 391 supports multiple connections, the processor 321 may be simultaneously connected to a plurality of external electronic devices. For another example, the processor 321 may be configured to receive a signal broadcast from at least one external electronic device, using the communication circuit 391. When at least one external electronic device is positioned in the vehicle 201 and a specified rotation is detected, at least one external electronic device may be configured to broadcast information (e.g., sensor information detected during rotation) associated with rotation. In this case, the vehicle 201 and at least one external electronic device may not establish a separate communication link. For example, operation 905 may be omitted. According to an embodiment, when the communication circuit 391 supports multiple protocols, the processor 321 may communicate with a plurality of external electronic devices using multiple protocols. For example, the processor 321 may communicate with the user device 203 based on a first protocol (e.g., BLUETOOTH or WIFI), and may communicate with at least one external electronic device based on a second protocol (e.g., BLE).

In operation 910, the processor 321 may determine whether a specified rotation of the vehicle 201 is detected. For example, the processor 321 may detect the specified rotation of the vehicle 201, using the inertial sensor of the sensor device 371, using steering information of the steering device 381 and the speedometer of the sensor device 371, or using the inertial sensor of the sensor device 371. For example, the processor 321 may determine that a specified rotation is detected, when the rotation of a specified angular velocity or more is detected. For another example, the processor 321 may determine that the specified rotation is not detected with respect to the rotation of less than the specified angular velocity and may continuously monitor the rotation of the vehicle 201 depending on operation 910.

In operation 915, when the specified rotation of the vehicle 201 is detected (e.g., 910-Y), the processor 321 may obtain movement information (e.g., sensor data detected by the inertial sensor of an external electronic device or the velocity of the external electronic device estimated by the external electronic device) of an external electronic device. For example, the processor 321 may be configured to periodically obtain movement information from an external electronic device. In this case, the processor 321 may obtain movement information of an interval corresponding to rotation among movement information that is periodically received. For another example, the external electronic device may be configured to transmit movement information in response to a specified rotation. In this case, the processor 321 may receive movement information transmitted by an external electronic device, using the communication circuit 391. For still another example, when the specified rotation is detected, the processor 321 may request the external electronic device to transmit movement information and may receive movement information in response to a request from an external electronic device.

In operation 920, the processor 321 may determine whether the reliability of movement information is not less than a specified value. For example, the processor 321 may determine whether the reliability of movement information is not less than a specified value, based on the type of external device (e.g., a stationary device or a non-stationary device) associated with sensor information. For another example, when the amount of movement of the external electronic device estimated by movement information is less than the specified amount, the processor 321 may determine that the reliability of movement information is not less than a specified value; when the amount of movement is not less than the specified amount, the processor 321 may determine that the reliability of movement information is less than the specified value. When the reliability of movement information is less than a specified value (e.g., 920-N), the processor 321 may monitor the rotation of the vehicle 201 depending on operation 910. According to an embodiment, operation 920 may be skipped. In this case, the vehicle 201 may skip operation 920 and then perform operation 925.

When the reliability of movement information is not less than a specified value (e.g., 920-Y) or when operation 920 is skipped, in operation 925, the processor 321 may estimate the movement parameter (e.g., the velocity of the external electronic device) of the external electronic device based on the movement information. For example, the processor 321 may estimate the movement parameter (e.g., velocity) of the external electronic device during at least a partial interval of the specified rotation of the vehicle 201 while the vehicle 201 rotates, using centripetal acceleration and angular velocity information measured by the external electronic device or using centripetal acceleration measured by the external electronic device and angular velocity information measured by the vehicle 201. According to an embodiment, the processor 321 may estimate the movement parameter of the external electronic device, using movement information in a constant-speed rotation interval (e.g., speed estimation confidence interval) in the rotation interval.

In operation 930, the processor 321 may determine a position of an external electronic device in the vehicle 201 by comparing a movement parameter with a reference movement parameter. For example, the reference movement parameter may include at least one of the velocity of the vehicle 201 preset depending on the angular velocity of the vehicle 201, the velocity estimated with respect to another external electronic device in the vehicle 201, or the velocity of the vehicle 201 estimated using the inertial sensor of the vehicle 201. For example, the processor 321 may determine the position of the user in the vehicle 201 depending on various methods described above with respect to the passenger recognizing module (e.g., the passenger recognizing module 430 of FIG. 4).

In operation 935, the processor 321 may determine whether a user of an external electronic device is a driver, based at least partly on the determined position. For example, the processor 321 may determine whether the user is a driver, depending on various methods described above in association with the passenger recognizing module 430.

According to various embodiments, the processor 321 may provide a service based on the identified user's role (e.g., a driver or a fellow passenger). For example, the processor 321 may provide a service depending on various methods described above in association with the service providing module 440.

For example, the driver determining method of FIG. 9 may be performed by the vehicle system 202. Hereinafter, a method of providing a service by the vehicle system 202 may be described with reference to FIGS. 3 and 9. Hereinafter, the operations of the processor 322 may be operations performed by the processor 322 when one or more instructions stored in the memory 332 are executed by the processor 322.

According to an embodiment, in operation 905, the processor 322 may connect to at least one external electronic device (e.g., the first external device 301, the second external device 302, the third external device 303, and/or the fourth external device 304) using the communication circuit 392. For example, the processor 322 may connect to at least one external electronic device based on short-range wireless communication such as V2D, BLUETOOTH, WIFI, and/or NFC, using the communication circuit 392. When the communication circuit 392 supports multiple connections, the processor 322 may be simultaneously connected to a plurality of external electronic devices. For another example, the processor 322 may be configured to receive a signal broadcast from at least one external electronic device, using the communication circuit 392. When at least one external electronic device is positioned in the vehicle 201 and a specified rotation is detected, at least one external electronic device may be configured to broadcast information (e.g., sensor information detected during rotation) associated with rotation. In this case, the vehicle system 202 and at least one external electronic device may not establish a separate communication link. For example, operation 905 may be omitted. According to an embodiment, when the communication circuit 392 supports multiple protocols, the processor 322 may communicate with a plurality of external electronic devices using multiple protocols. For example, the processor 322 may communicate with the user device 203 based on a first protocol (e.g., BLUETOOTH or WIFI), and may communicate with at least one external electronic device based on a second protocol (e.g., BLE).

According to an embodiment, in operation 910, the processor 322 may determine whether a specified rotation of the vehicle 201 is detected. For example, the processor 322 may detect the specified rotation of the vehicle 201, using the inertial sensor of the sensor device 371, using steering information of the steering device 381 and the speedometer of the sensor device 371, or using the inertial sensor of the sensor device 371. For example, the processor 322 may determine that a specified rotation is detected, when the rotation of a specified angular velocity or more is detected. For another example, the processor 322 may determine that the specified rotation is not detected with respect to the rotation of less than the specified angular velocity and may continuously monitor the rotation of the vehicle 201 depending on operation 910.

According to an embodiment, in operation 915, when the specified rotation of the vehicle 201 is detected (e.g., 910-Y), the processor 322 may obtain movement information (e.g., sensor data detected by the inertial sensor of an external electronic device or the velocity of the external electronic device estimated by the external electronic device) of an external electronic device. For example, the processor 322 may be configured to periodically obtain movement information from an external electronic device. In this case, the processor 322 may obtain movement information of an interval corresponding to rotation among movement information that is periodically received. For another example, the external electronic device may be configured to transmit movement information in response to a specified rotation. In this case, the processor 322 may receive movement information transmitted by an external electronic device, using the communication circuit 392. For still another example, when the specified rotation is detected, the processor 322 may request the external electronic device to transmit movement information and may receive movement information in response to a request from an external electronic device.

According to an embodiment, in operation 920, the processor 322 may determine whether the reliability of movement information is not less than a specified value. For example, the processor 322 may determine whether the reliability of movement information is not less than a specified value, based on the type of external device (e.g., a stationary device or a non-stationary device) associated with sensor information. For another example, when the amount of movement of the external electronic device estimated by movement information is less than the specified amount, the processor 322 may determine that the reliability of movement information is not less than a specified value; when the amount of movement is not less than the specified amount, the processor 321 may determine that the reliability of movement information is less than the specified value. When the reliability of movement information is less than a specified value (e.g., 920-N), the processor 322 may monitor the rotation of the vehicle 201 depending on operation 910. According to an embodiment, operation 920 may be skipped. In this case, the vehicle system 202 may skip operation 920 and perform operation 925.

According to an embodiment, when the reliability of movement information is not less than a specified value (e.g., 920-Y) or when operation 920 is skipped, in operation 925, the processor 322 may estimate the movement parameter (e.g., the velocity of the external electronic device) of the external electronic device based on the movement information. For example, the processor 322 may estimate the movement parameter (e.g., velocity) of the external electronic device during at least a partial interval of the specified rotation of the vehicle 201 while the vehicle 201 rotates, using centripetal acceleration and angular velocity information measured by the external electronic device or using centripetal acceleration measured by the external electronic device and angular velocity information of the vehicle 201. According to an embodiment, the processor 322 may estimate the movement parameter of the external electronic device, using movement information in a constant-speed rotation interval (e.g., speed estimation confidence interval) in the rotation interval.

According to an embodiment, in operation 930, the processor 322 may determine a position of an external electronic device in the vehicle 201 by comparing a movement parameter with a reference movement parameter. For example, the reference movement parameter may include at least one of the velocity of the vehicle 201 preset depending on the angular velocity of the vehicle 201, the velocity estimated with respect to another external electronic device in the vehicle 201, or the velocity of the vehicle 201 estimated using the inertial sensor of the vehicle 201 or the vehicle system 202. For example, the processor 322 may determine the position of the user in the vehicle 201 depending on various methods described above with respect to the passenger recognizing module (e.g., the passenger recognizing module 430 of FIG. 4).

According to an embodiment, in operation 935, the processor 322 may determine whether a user of an external electronic device is a driver, based at least partly on the determined position. For example, the processor 322 may determine whether the user is a driver, depending on various methods described above in association with the passenger recognizing module 430.

According to various embodiments, the processor 322 may provide a service based on the identified user's role (e.g., a driver or a fellow passenger). For example, the processor 322 may provide a service depending on various methods described above in association with the service providing module 440. The processor 322 may provide a service, using various external electronic devices of the vehicle 201 connected to the vehicle system 202.

For example, the driver determining method of FIG. 9 may be performed by the user device 203. Hereinafter, a method of providing a service by the user device 203 may be described with reference to FIGS. 3 and 9. Hereinafter, the operations of the processor 323 may be operations performed by the processor 323 when one or more instructions stored in the memory 333 are executed by the processor 323. For example, the user device 203 may be connected to the vehicle 201 or the vehicle system 202 by wire or wirelessly.

According to an embodiment, in operation 905, the processor 323 may connect to at least one external electronic device (e.g., the first external device 301, the second external device 302, the third external device 303, and/or the fourth external device 304) using the communication circuit 393. For example, the processor 323 may connect to at least one external electronic device, using short-range wireless communication such as V2D, BLUETOOTH, WIFI, and/or NFC. For another example, the processor 323 may be configured to receive a signal broadcast from at least one external electronic device, using the communication circuit 393. When it is detected that at least one external electronic device is positioned within the vehicle 201 and the rotation of at least one external electronic device is detected, at least one external electronic device may be configured to broadcast sensor information (e.g., sensor information measured at rotation) associated with rotation. According to an embodiment, the user device 203 and at least one external electronic device may not establish a separate communication link. For example, operation 905 may be omitted. The user device 203 and at least one external electronic device may be configured to transmit and receive signals using a specified wireless resource. For example, the user device 203 may communicate with the vehicle 201 or the vehicle system 202 based on a first protocol (e.g., BLUETOOTH or WIFI), and may communicate with at least one external electronic device based on a second protocol (e.g., BLE). For another example, the user device 203 may communicate based on the same protocol as the vehicle 201, the vehicle system 202, and at least one external electronic device.

According to an embodiment, in operation 910, the processor 323 may determine whether a specified rotation of the vehicle 201 is detected. For example, the processor 323 may detect a specified rotation of the vehicle 201, using an inertial sensor of the sensor circuit 373. For example, the processor 323 may determine that a specified rotation is detected, when the rotation of a first value (e.g., a specified angular velocity) or more is detected. For another example, the processor 323 may determine that the specified rotation is not detected with respect to the rotation of less than the specified angular velocity and may continuously monitor the rotation of the vehicle 201 depending on operation 910.

According to an embodiment, in operation 915, when the specified rotation of the vehicle 201 is detected (e.g., 910-Y), the processor 323 may obtain movement information (e.g., sensor data detected by the inertial sensor of an external electronic device or the velocity of the external electronic device estimated by the external electronic device) of an external electronic device. For example, the processor 323 may be configured to periodically obtain movement information from an external electronic device. In this case, the processor 323 may obtain movement information of an interval corresponding to rotation among movement information that is periodically received. For another example, the external electronic device may be configured to transmit (or broadcast) movement information in response to a specified rotation. In this case, the processor 323 may receive movement information transmitted by an external electronic device, using the communication circuit 393. For still another example, when the specified rotation is detected, the processor 323 may request the external electronic device to transmit movement information and may receive movement information in response to a request from an external electronic device.

According to an embodiment, in operation 920, the processor 323 may determine whether the reliability of movement information is not less than a specified value. For example, the processor 323 may determine whether the reliability of movement information is not less than a specified value, based on the type of external device (e.g., a stationary device or a non-stationary device) associated with sensor information. For another example, when the amount of movement of the external electronic device estimated by movement information is less than the specified amount, the processor 323 may determine that the reliability of movement information is not less than a specified value; when the amount of movement is not less than the specified amount, the processor 321 may determine that the reliability of movement information is less than the specified value. When the reliability of movement information is less than a specified value (e.g., 920-N), the processor 323 may monitor the rotation of the vehicle 201 depending on operation 910. According to an embodiment, operation 920 may be skipped. In this case, the user device 203 may skip operation 920 and perform operation 925.

According to an embodiment, when the reliability of movement information is not less than a specified value (e.g., 920-Y) or when operation 920 is skipped, in operation 925, the processor 323 may estimate the movement parameter (e.g., the velocity of the external electronic device) of the external electronic device based on the movement information. For example, the processor 323 may estimate the movement parameter (e.g., velocity) of the external electronic device during at least a partial interval of the specified rotation of the vehicle 201 while the vehicle 201 rotates, using centripetal acceleration and angular velocity information measured by the external electronic device or using centripetal acceleration measured by the external electronic device and angular velocity information of the vehicle 201. According to an embodiment, the processor 323 may estimate the movement parameter of the external electronic device, using movement information in a constant-speed rotation interval (e.g., speed estimation confidence interval) in the rotation interval.

According to an embodiment, in operation 930, the processor 323 may determine a position of an external electronic device in the vehicle 201 by comparing a movement parameter with a reference movement parameter. For example, the reference movement parameter may include at least one of the velocity of the vehicle 201 preset depending on the angular velocity of the vehicle 201, the velocity estimated with respect to another external electronic device in the vehicle 201, or the velocity of the vehicle 201 estimated using the inertial sensor of the sensor circuit 373. For example, the processor 323 may determine the position of the user in the vehicle 201 depending on various methods described above with respect to the passenger recognizing module (e.g., the passenger recognizing module 430 of FIG. 4).

According to an embodiment, in operation 935, the processor 323 may determine whether a user of an external electronic device is a driver, based at least partly on the determined position. For example, the processor 323 may determine whether the user is a driver, depending on various methods described above in association with the passenger recognizing module 430.

According to various embodiments, the processor 323 may provide a service based on the identified user's role (e.g., a driver or a fellow passenger). For example, the processor 323 may provide a service depending on various methods described above in association with the service providing module 440. The processor 322 may provide a service, using various electronic devices of the vehicle 201 connected to the vehicle system 202.

According to various embodiments disclosed in this specification, an electronic device may determine the position of an external electronic device in a vehicle, using the feature of dynamics of the external electronic device measured when the feature of dynamics of the vehicle is changed.

According to various embodiments disclosed in this specification, the electronic device may improve a user experience by providing a service matched with the context of a user associated based on the determined position.

Besides, a variety of effects directly or indirectly understood through the disclosure may be provided.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a motion sensor;
a communication circuit;
a processor operatively connected to the motion sensor and the communication circuit; and
a memory operatively connected to the processor, wherein the memory stores one or more instructions that, when executed, cause the processor to:
when connected to an in-vehicle electronic device of a vehicle, monitor movement of the electronic device, using the motion sensor;
obtain first movement information of a first external electronic device from the first external electronic device within the vehicle, using the communication circuit;
when a specified rotation with an angular velocity greater than or equal to a first value is detected using the motion sensor, estimate, based on the first movement information, a first movement parameter of the first external electronic device generated by the specified rotation; and
compare the first movement parameter with a reference value to estimate a position of the first external electronic device within the vehicle.

2. The electronic device of claim 1, wherein the first movement parameter corresponds to a velocity of the first external electronic device during the specified rotation.

3. The electronic device of claim 2, wherein the one or more instructions, when executed, cause the processor to:
estimate the velocity of the first external electronic device, using a centripetal acceleration by the specified rotation of the first external electronic device and an angular velocity of the electronic device detected during the specified rotation by the motion sensor, which are included in the first movement information.

4. The electronic device of claim 2, wherein the reference value includes at least one of a velocity of the electronic device or a velocity of a second external electronic device in the vehicle, which are detected by the motion sensor based on the specified rotation.

5. The electronic device of claim 1, wherein the one or more instructions, when executed, cause the processor to:
identify a constant-speed rotation interval during the specified rotation; and
estimate the first movement parameter, using the first movement information corresponding to the identified constant-speed rotation interval.

6. The electronic device of claim 5, wherein the one or more instructions, when executed, cause the processor to:
compare a second value with a variance value of an angular velocity measured by the motion sensor during the specified rotation to identify the constant-speed rotation interval.

7. The electronic device of claim 1, wherein the one or more instructions, when executed, cause the processor to:
determine whether a user of the first external electronic device is a driver of the vehicle, based at least partly on the position of the first external electronic device in the vehicle.

8. A vehicle comprising:
a wireless communication circuit;
an inertial sensor;
a processor operatively connected to the wireless communication circuit and the inertial sensor; and
a memory operatively connected to the processor, wherein the memory stores one or more instructions that, when executed, cause the processor to:
obtain first movement information of a first external electronic device from the first external electronic device within the vehicle, using the wireless communication circuit;
when a specified rotation with an angular velocity greater than or equal to a first value is detected using the inertial sensor, estimate, based on the first movement information, a first movement parameter of the first external electronic device generated by the specified rotation; and
compare the first movement parameter with a reference value to estimate a position of the first external electronic device within the vehicle.

9. The vehicle of claim 8, wherein:
the first movement parameter corresponds to a velocity of the first external electronic device during the specified rotation, and
the one or more instructions, when executed, cause the processor to:
estimate the velocity of the first external electronic device, using a centripetal acceleration by the specified rotation of the first external electronic device and an angular velocity of the vehicle detected during the specified rotation by the inertial sensor, which are included in the first movement information.

10. The vehicle of claim 9, wherein the reference value includes at least one of a velocity of the vehicle or a velocity of a second external electronic device in the vehicle.

11. The vehicle of claim 8, wherein the one or more instructions, when executed, cause the processor to:
identify a constant-speed rotation interval during the specified rotation; and
estimate the first movement parameter, using the first movement information corresponding to the identified constant-speed rotation interval.

12. The vehicle of claim 11, wherein the one or more instructions, when executed, cause the processor to:
compare a second value with a variance value of an angular velocity measured by the inertial sensor during the specified rotation to identify the constant-speed rotation interval.

13. The vehicle of claim 12, wherein the one or more instructions, when executed, cause the processor to:
determine whether a user of the first external electronic device is a driver of the vehicle, based at least partly on the position of the first external electronic device in the vehicle.

14. An operation method of an electronic device for determining a position of a first external electronic device within a vehicle, the method comprising:
monitoring movement of the vehicle, using a motion sensor of the electronic device;
obtaining first movement information of the first external electronic device from the first external electronic device;
when a specified rotation with an angular velocity greater than or equal to a first value is detected using the motion sensor, estimating, based on the first movement information, a first movement parameter of the first external electronic device generated by the specified rotation; and
comparing the first movement parameter with a reference value to estimate the position of the first external electronic device within the vehicle.

15. The method of claim 14, wherein the estimating of the first movement parameter of the first external electronic device includes:
estimating a velocity of the first external electronic device as the first movement parameter, using a centripetal acceleration by the specified rotation of the first external electronic device and an angular velocity of the electronic device detected during the specified rotation by the motion sensor, which are included in the first movement information.

16. The method of claim 14, wherein the estimating of the first movement parameter of the first external electronic device includes:
identifying a constant-speed rotation interval during the specified rotation; and
estimating the first movement parameter, using the first movement information corresponding to the identified constant-speed rotation interval.

17. The method of claim 16, wherein the identifying of the constant-speed rotation interval includes:
comparing a second value with a variance value of an angular velocity measured by the motion sensor during the specified rotation to identify the constant-speed rotation interval.

* * * * *